United States Patent [19]

Brouard et al.

[11] 4,218,367
[45] Aug. 19, 1980

[54] REACTIVE COMPLEX CHROMIUM-BEARING AZO DYESTUFFS

[75] Inventors: Claude M. H. E. Brouard, St. Pierre les Elbeuf; Claude L. E. Moerel, Bihorel, both of France

[73] Assignee: Produits Chimiques Ugine Kuhlmann, Paris, France

[21] Appl. No.: 745,275

[22] Filed: Nov. 26, 1976

[30] Foreign Application Priority Data

Nov. 28, 1975 [FR] France .................................. 75 36461

[51] Int. Cl.$^2$ ...................... C09B 62/08; C09B 62/24; C09B 62/40; C09B 62/50
[52] U.S. Cl. ........................... 260/146 R; 260/146 D; 260/146 T; 260/147; 260/148; 260/149; 260/150; 260/151
[58] Field of Search ............ 260/146 R, 146 D, 146 T, 260/147, 148, 149, 150, 151, 145 A, 145 B

[56] References Cited

U.S. PATENT DOCUMENTS

| 3,308,114 | 3/1967 | Blackhall | 260/145 B |
| 3,354,140 | 11/1967 | Benz et al. | 260/146 T |
| 3,526,617 | 9/1970 | Fuchs et al. | 260/151 |
| 3,538,073 | 11/1970 | Mack et al. | 260/146 D |
| 3,544,546 | 12/1970 | Crabtree et al. | 260/145 B |
| 3,878,158 | 4/1975 | Brouard et al. | 260/147 X |

FOREIGN PATENT DOCUMENTS

| 2318412 | 10/1974 | Fed. Rep. of Germany | 260/153 |
| 1310178 | 10/1962 | France | 260/146 T |

*Primary Examiner*—Floyd D. Higel
*Attorney, Agent, or Firm*—Beveridge, Degrandi, Kline & Lunsford

[57] ABSTRACT

Complex chromium-bearing dyestuffs of formula:

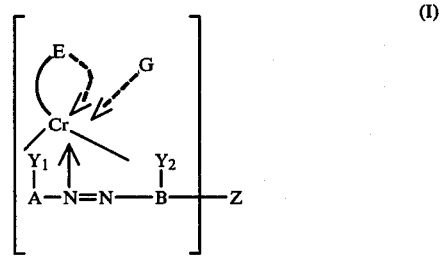

(I)

where
A represents a diazotizable amine residue,
B represents the residue of a coupling agent,
$Y_1$ represents a —O— or

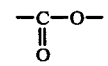

residue,
$Y_2$ represents a —O— or

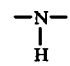

residue,
E represents the residue of a monoanionic bifunctional chelating agent,
$Y_1$ and $Y_2$ are respectively in the ortho position with respect to the —N=N— group,
G represents a neutral monofunctional ligand, and
Z represents a reactive group attached to A or B directly or via a bridging group such as

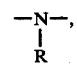

—SO$_2$NH— or —CO—NH—, R denoting hydrogen or an alkyl radical having 1 to 2 carbon atoms; their process of preparation, and their application for dyeing of a variety of natural or synthetic fibers and fabrics including regenerated cellulose, wool, silk, synthetic polyamides. They may also be used for the dyeing of leather.

10 Claims, No Drawings

REACTIVE COMPLEX CHROMIUM-BEARING AZO DYESTUFFS

The present invention relates to the preparation and applications of new reactive chromium-containing complex dyes.

These new reactive chromium-containing complex dyes correspond to the following general formula:

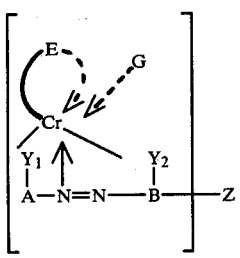
(I)

in which:
A represents a diazotizable amine residue,
B represents a coupling agent residue,
$Y_1$ represents —O— or

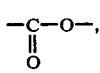

$Y_2$ represents —O— or

E represents the residue of a monoionic, bifunctional chelating agent, E - H
G represents a monofunctional neutral ligand,
Z represents a reactive group which may be attached to A or B directly, or via a bridging group such as

(  —SO$_2$NH—, or —CO—NH—, with R denoting hydrogen or alkyl containing 1 or 2 carbon atoms.

The dyestuff molecule contains at least one and up to at most five sulfonic groups per atom of chromium.

The diazotizable amine residue A can be, for example, a benzene or naphthalene nucleus, which may be unsubstituted or substituted at one, two or three positions. The term residue is intended to mean the benzene or naphthalene ring minus 2 hydrogen atoms so that the ring is directly bonded to the remainder of the molecule. The possible substituents are all those encountered generally in the chemistry of azo dyestuffs, such as for example; alkyl, alkoxy, halogen, —NO$_2$, —CO$_2$H, —SO$_3$H, —NH$_2$, —NH-alkyl, —NH-acyl, —alkylsulfonyl, —sulfonamide, and the like. Also included among the possible substituents are azoaryls wherein the aryl e.g., benzene or naphthalene, nucleus may contain one or more substituents such as those set forth above. Thus A in general is a diazotizable aromatic amine residue of either mono or bicyclic nature.

The term halogen as used herein generally means chlorine, bromine and fluorine although chlorine is most common. Examples of coupling agent residue B may be the residue of an enol such as an acetoacetarylide or a 5-pyrazolone, or the residue of a substituted or unsubstituted aniline, phenol, naphthylamine, naphthol, or coupleable heterocyclic derivative, such as a derivative of methylphenyl pyrazolone. These different residues of a coupling agent may bear from 1 to 4 substituents such as those enumerated above and/or an arylazo residue, which may likewise be substituted. By residue is meant the bifunctional group remaining after removing, for example, 2 atoms of hydrogen.

As used herein the terms alkyl, alkoxy, —NH-alkyl, —NH-acyl, and alkylsulfonyl generally mean those containing 1 to 4 carbon atoms, but preferably having 1 to 2 carbon atoms.

The nature, number and preferred position of the substituents A and B are illustrated by the examples given later.

The monoanionic bifunctional chelating agent corresponding to the residue E may be for example a beta-diketone, an acetoacetarylide, an o-hydroxyaldehyde, an o-nitrosophenol or naphthol, or a perihydroxyquinone. The most advantageous chelating agents are illustrated in the examples given later, and among these the beta-diketones and particularly acetylacetone are the preferred chelating agents. The monoanionic bifunctional chelating agents are products which can bind to chromium by one covalent bond and one coordination bond, forming with the chromium atom a five or six-membered ring.

The neutral monofunctional ligand G can represent a molecule of water, of ammonia, or of an organic base such as for example pyridine, laurylamine, ethylamine, ethanolamine or mixtures of these bases.

The groups $Y_1$ and $Y_2$ respectively occupy the ortho position with respect to the —N=N—group.

Z denotes one or more reactive groups or splittable substituents which, when the dyes are applied to cellulosic goods in the presence of an acid-fixing agent and optionally under the action of heat, permit reaction to occur with the hydroxyl groups of cellulose; or, when the dyes are applied to fibers of super-polyamides like wool, permit reaction with the —NH—groups of these fibers with the formation of covalent bonds.

The reactive groups which are capable of reacting with fibers which are suitable according to the invention are well known to those skilled in the art and are in particular those defined in pages 2 to 6 of the French Pat. No. 2,225,486 filed on Apr. 1, 1974. The entire disclosure of said French patent application is incorporated by reference and relied on.

As may be seen from the latter patent application, the said reactive groups are very numerous, and the preferred reactive groups, which are those described in the present application in the examples given later, and also the substituent —CO—CH$_2$Cl, are not limitative.

The reactive group Z is linked to the dye residue at A or at B by a direct bond or a bridge, the latter being most frequently a

(R=H, methyl or ethyl), —CONH— or —SO$_2$NH—.

The invention likewise relates to processes for the preparation of the new chromium-bearing complex dyes defined above. Generally, metallizable azo dyes are transformed into their 1/1 chromium-bearing complexes of structure:

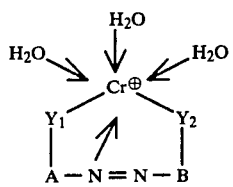

(III)

The diazotization and coupling reactions are carried out in a known manner. The transformation into a 1/1 chromium complex is likewise carried out in a known manner, preferably in an aqueous medium at an acid pH and at a temperature ranging between 100° C. and 150° C. A monoanionic bifunctional chelating agent E-H is then reacted with these 1/1 chromium-bearing complexes in the presence of a monofunctional ligand such as water, ammonia, an organic base such as pyridine, or a mixture of these ligands. Preferably, the reaction takes place in an aqueous medium, operating at a temperature between 20° C. and 100° C. and at a pH ranging between 7 and 10. The reaction can take place in the presence of caustic soda in aqueous solution. The yields are generally excellent.

Fixation of the reactive group Z is carried out according to the known methods, for example those described at page 8 of the French Pat. No. 2,225,486 referred to above. According to an important aspect of the invention, fixation of the reactive group Z to the chromium (III) complex, previously chelated by the agent E-H, is carried out in aqueous media at a temperature ranging between 0° and 40° C. and at a pH ranging between 4 and 10. This aspect is applied, in particular, to reactive groups derived from cyanuryl chloride, dichlorophthalazine, dichloroquinoxaline, chlorobenzothiazole.

However, according to the invention, the fixation of the reactive group Z can take place before chelation by the agent E-H: such is the case, for example, for the reactive groups —SO₂—CH₂—CH₂—OSO₃H, —SO₂—NH—CH₂—CH₂—OSO₃H, —SO₂—CH=CH₂, —SO₂—CH₂—CH₂Cl, —SO₂—NH—CH₂—CH₂—Cl; this list is not limitative.

According to a particular form of carrying out the invention, there can be fixed on the same cyanuryl chloride radical

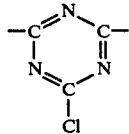

(abbreviated

2 identical or different molecules of the chromium (III) complex, chelated by means of the chelating agent E-H. Included among the novel compounds of this invention are compounds wherein A is a benzene or naphthalene nucleus which may be unsubstituted or substituted and wherein the benzene or naphthalene ring is directly bonded to the remainder of the dyestuff; B is acetoacetarylide, a 5-pyrazolone, substituted or unsubstituted aniline, phenol, naphthylamine naphthol, methylphenol pyrazolone; E is a beta-diketone, an acetoacetarylide, O-hydroxyaldehyde, O-nitrosophenol, naphthol or perihydroxyquinone; G is water, ammonia, pyridine, laurylamine, ethylamine or ethanolamine and Z is —SO₂—CH₂—CH₂—OSO₃H, —SO₂—NH—CH₂—CH₂—OSO₃H, —SO₂—CH=CH₂, —SO₂—CH₂—CH₂—Cl or —SO₂—NH—CH₂—CH₂—Cl, or a reactive group derived from cyanuryle chloride, dichlorophtalazine, dichloroquinoxaline, or chlorbenzothiazol.

Further within the scope of the invention are compounds of the formula I wherein:

A is

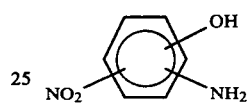

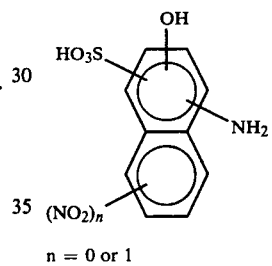

n = 0 or 1

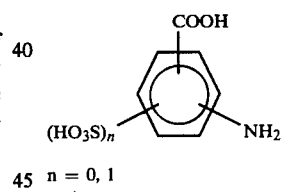

n = 0, 1

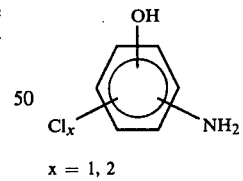

x = 1, 2

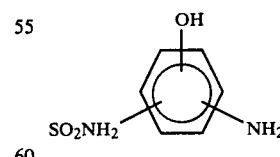

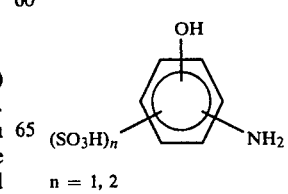

n = 1, 2

B is:

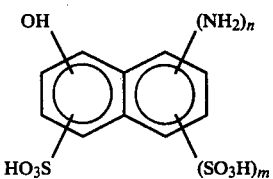

n = 0 or 1; m = 0 or 1; m + n = 1 or 2

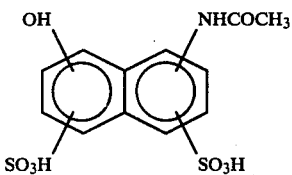

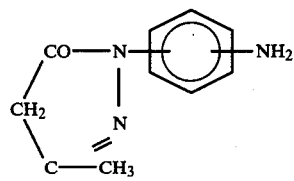

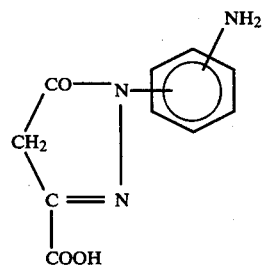

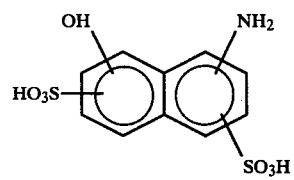

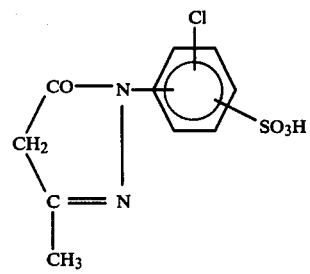

E - H is:
CH₃COCH₂COCH₃
C₆H₅COCH₂COCH₃
1,3-diphenyl-1,3 propandione,
salicylaldehyde,
4,6-dichlorosalicyclaldehyde
1-nitroso-2-naphthol,
1,4-dihydroxyanthraquinone,
2-hydroxy-1-naphthaldehyde
Z is:

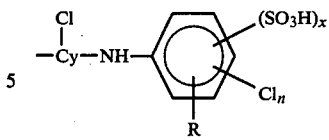

x = 0, 1, 2
n = 0, 1
R = H or (lower alkyl)methyl

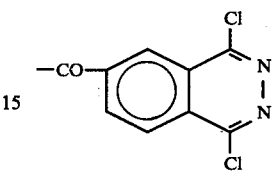

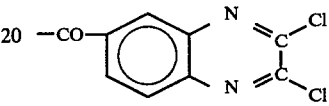

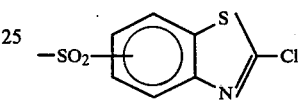

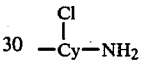

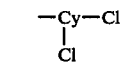

G is: water, ammonia or pyridine.

Finally, the invention is concerned with the application of these new reactive chromium-bearing complex dyestuffs. These new dyestuffs are suitable for coloring, by dyeing or by printing, of natural or synthetic goods containing hydroxyl or amide groups such as natural cellulose, regenerated cellulose, wool, silk, synthetic polyamides, and leather. A variety of fibers, filaments yarns and fabrics may be dyed in accordance with the invention.

As for the majority of known reactive dyes, these new chromium-bearing complexes can be utilized by the known processes of padding, exhaustion, or printing.

The processes of padding comprise particularly, according to the state of technology, padding-thermofixing, padding with cold windup, padding-steaming, padding with hot windup, and padding-jig.

The new complexes are characterized by their good fastness of shade and their good tinctorial yields.

In relation of the known analogous reactive ½ chromium-bearing complexes, that is, containing 1 atom of chromium per 2 identical or different molecules of azo dye and containing no colorless ligand, the new complexes of the invention are distinguished by their very superior brilliance and, in a surprising fashion, by an increased tinctorial yield by the process of exhaustion.

In relation to the known reactive 1/1 chromium-bearing complexes, that is, containing 1 atom of chromium per 1 molecule of azo dye and in addition containing a colorless ligand such as, for example, 3 molecules of water or of ammonia per 1 molecule of the complex, the new complexes according to the invention are distinguished by identical or superior brilliance, improved stability, and likewise by an increased tinctorial yield by the process of the exhaustion.

The process of exhaustion is particularly suitable for dyeing of yarns and threads, as is known in the art.

The scope of the invention will be better understood from the following examples, which are given by way of illustration and are not intended to be limiting. The parts are given therein by weight.

EXAMPLE 1

Formation of the 1/1 chromium-acetylacetone complex

In a round flask furnished with a stirrer, a cooler and a thermometer, there are partly dissolved at ambient temperature 58.8 parts of the 1/1 chromium complex (Mol Wt.=588) corresponding to the formula:

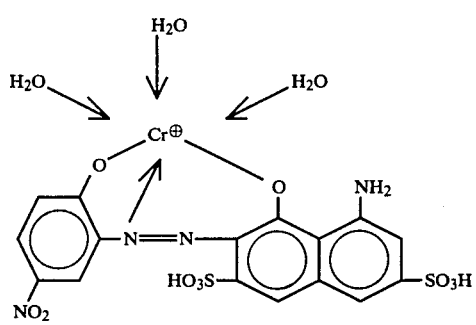

in 600 parts of water and 15 parts of acetylacetone.

The pH is brought to 9 using 25% ammonia. Heating is carried out slowly up to 65°-70° C., avoiding the formation of the symmetrical ½ chromium complex, until the end of the reaction. The course of the reaction is very easily followed by thin layer chromatography on silica.

At the end of the reaction, the products are allowed to cool, with stirring. The products are diluted if necessary, so that the dye is completely dissolved. The complex, obtained almost quantitatively, is not isolated; it corresponds to the following formula:

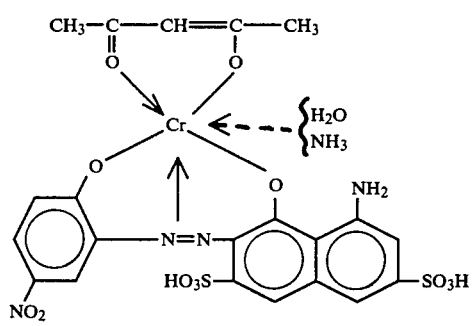

Condensation with cyanuryl chloride:

To the previous aqueous solution, cooled to 0° C. by an ice-salt brine, there are added 12.5 parts of sodium bicarbonate and, in small amounts during 10 minutes, 25 parts of cyanuryl chloride, while keeping the pH at a value close to, or slightly above, 8 by addition of dilute caustic soda. The course of the reaction is very easily followed by thin layer chromatography on silica. The reaction is completely finished after 4 hours of stirring at 0° C. under the above stated conditions.

The solution is salted and filtered. The paste of the dye obtained corresponds to the formula:

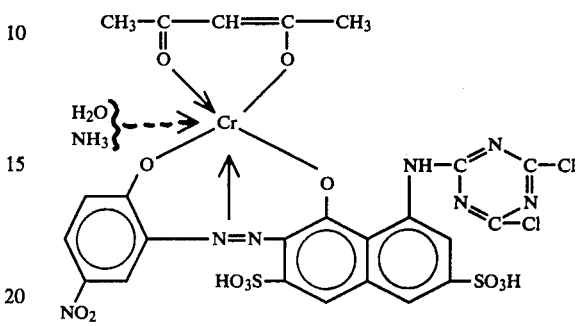

It is immediately mixed with an equimolar mixture of mono and disodium phosphates, to avoid possible hydrolysis (this mixture buffers the medium at pH 7), and is then dried at 60° C.

The dyestuff obtained under these conditions and whose preparation has just been described dyes cotton gray-blue, fast to light.

EXAMPLE 2

Under the same conditions as described in Example 1, at the end of condensation of the cyanuryl chloride there is added 25% ammonia until there is no further variation of pH. The solution is heated to 35° C. while maintaining the pH at a value above 8. At the end of the reaction, the dyestuff is precipitated by salting-out, and is filtered off. The dyestuff, dried at 60° C. corresponds to the formula:

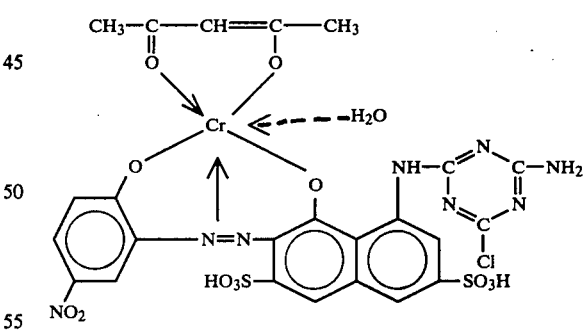

It dyes cellulosic fibers to gray-blue shades, fast to light.

EXAMPLE 3

Proceeding as in Example 1 to the end of the condensation of cyanuryl chloride, the reaction mass is allowed to warm to 10° C. A basic aqueous solution of 23.5 parts of 1-aminobenzene-3-sulfonic acid is then added. The whole is heated to 35° C., while maintaining the pH at a value slightly above 8. A dyestuff is precipitated by salting-out, and is filtered and dried at 60° C.; it corresponds to the following formula:

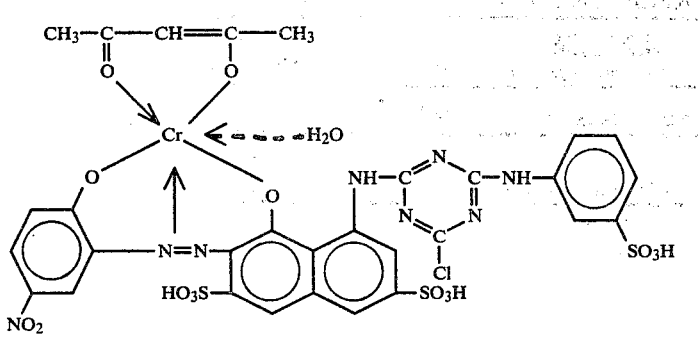

It dyes fibers, particularly of cotton, to gray-blue shades, fast to light.

Other examples, carried out under conditions similar to those described in Examples 1 to 3, feature in the following table (Table I). The representation

symbolizes the s-triazine group bearing 1 atom of chlorine.

TABLE I

| Ex. | Diazotization Component A | Coupling Component B | Chelating Agent EH | G | Reactive Residue Z | Shades |
|---|---|---|---|---|---|---|
| 4 | OH, NH₂, NO₂ (substituted benzene) | OH NH₂, HO₃S, SO₃H (naphthalene) | CH₃COCH₂COCH₃ | H₂O | —Cy(Cl)—NH—⟨phenyl⟩ | Gray |
| 5 | " | " | " | " | —Cy(Cl)—NH—⟨phenyl-SO₃H (ortho)⟩ | " |
| 6 | " | " | " | " | —Cy(Cl)—NH—⟨phenyl-(SO₃H)₂⟩ | " |
| 7 | " | " | " | " | —Cy(Cl)—NH—⟨phenyl-SO₃H, CH₃⟩ | " |
| 8 | " | " | " | " | —Cy(Cl)—NH—⟨phenyl⟩—SO₃H | " |
| 9 | " | " | " | " | —CO—⟨phthalazine-Cl₂⟩ | " |
| 10 | " | " | " | " | —CO—⟨quinoxaline-Cl₂⟩ | " |
| 11 | " | " | " | " | —SO₂—⟨benzothiazole-Cl⟩ | " |
| 12 | " | OH, NH₂, HO₃S (naphthalene) | " | " | —Cy(Cl)—NH—⟨phenyl-SO₃H⟩ | " |
| 13 | " | " | " |  | " | " |

TABLE I-continued

| Ex. | Diazotization Component A | Coupling Component B | Chelating Agent EH | G | Reactive Residue Z | Shades |
|---|---|---|---|---|---|---|
| 14 | " | 1,8-dihydroxy... (OH, NH₂ on naphthalene with SO₃H groups) | " | H₂O | " | " |
| 15 | " | naphthalene with OH, HO₃S, NH₂ | " | " | " | " |
| 16 | 2-amino-4-nitrophenol (O₂N–C₆H₃(OH)–NH₂) | naphthalene with OH, NH₂, HO₃S, SO₃H | " | " | " | " |
| 17 | " | naphthalene with OH, NH₂, HO₃S, SO₃H | " | " | " | " |
| 18 | " | naphthalene with OH, HO₃S, NH₂ | " | " | " | " |
| 19 | " | naphthalene with OH, NH₂, HO₃S | " | " | " | " |
| 20 | " | naphthalene with OH, NH₂, HO₃S, SO₃H | " | " | –CO–(dichloroquinoxalinyl) | " |
| 21 | 2-amino-1-hydroxy-3-sulfo-5-nitrobenzene | naphthalene with OH, NH₂, HO₃S, SO₃H | " | " | –Cy(Cl)–NH–C₆H₄–SO₃H | " |
| 22 | " | naphthalene with OH, HO₃S, NH₂ | " | " | –CO–(dichloroquinoxalinyl) | " |
| 23 | anthranilic acid (COOH, NH₂) | " | " | " | –CO–(dichlorophthalazinyl) | Brown |
| 24 | 2-amino-5-sulfobenzoic acid (COOH, NH₂, HO₂S) | " | " | " | " | " |
| 25 | 2-amino-4-sulfobenzoic acid (COOH, NH₂, HO₃S) | " | " | " | " | " |
| 26 | " | " | " | " | –Cy(Cl)–NH–C₆H₃(SO₃H)(SO₃H) | " |

TABLE I-continued

| Ex. | Diazotization Component A | Coupling Component B | Chelating Agent EH | G | Reactive Residue Z | Shades |
|---|---|---|---|---|---|---|
| 27 | 4-chloro-2-aminophenol (OH, NH₂, Cl) | 8-hydroxy-7-amino-naphthalene-3,6-disulfonic acid (OH, NH₂, HO₃S, SO₃H) | " | " | −Cy(Cl)−NH−C₆H₄−SO₃H (meta) | Blue |
| 28 | " | " | " | pyridine | " | " |
| 29 | " | " | " | H₂O | −Cy(Cl)−NH−C₆H₅ | " |
| 30 | " | " | " | " | −Cy(Cl)−NH−C₆H₃(Cl)(SO₃H) | " |
| 31 | " | " | " | " | −CO−(dichlorophthalazinyl) | " |
| 32 | 4,6-dichloro-2-aminophenol | same as 27 | " | " | −Cy(Cl)−NH−C₆H₄−SO₃H | " |
| 33 | 2-amino-4-sulfamoylphenol | 8-hydroxy-7-acetylamino-naphthalene-3,6-disulfonic acid | " | " | " | " |
| 34 | 2-amino-4-sulfophenol | same as 27 | " | " | −CO−(dichlorophthalazinyl) | Violet |
| 35 | " | " | " | " | −Cy(Cl)−NH−C₆H₄−SO₃H | " |
| 36 | 2-amino-4-sulfamoylphenol (NH₂SO₂) | 8-hydroxy-naphthalene-3,6-disulfonic acid | " | " | " | " |
| 37 | 2-amino-4-aminosulfonylphenol (NH₂SO₂) | same as 36 | " | " | −CO−(dichlorophthalazinyl) | Violet |
| 38 | 2-amino-5-sulfo-benzoic acid (COOH, NH₂, SO₃H) | same as 27 | " | " | " | " |

TABLE I-continued

| Ex. | Diazotization Component A | Coupling Component B | Chelating Agent EH | G | Reactive Residue Z | Shades |
|---|---|---|---|---|---|---|
| 39 | 2-amino-3,5-disulfo-phenol (HO3S, OH, NH2, HO3S) | CO-N(C6H4-NH2)-CH2-C(CH3)=N (pyrazolone-type with 4-aminophenyl) | " | " | " | Red |
| 40 | 2-amino-4-sulfo-phenol (OH, NH2, SO3H) | CO-N(C6H4-NH2)-CH2-C(COOH)=N | " | " | " | " |
| 41 | 2-amino-5-sulfamoyl-phenol (OH, NH2, NH2SO2) | CO-N(4-Cl-3-SO3H-C6H3)-CH2-C(CH3)=N | " | " | -Cy(Cl)-NH-C6H3(SO3H) | Red |
| 42 | 1-amino-2-hydroxy-naphthalene-4-sulfonic acid (HO3S, OH, NH2) | CO-N(C6H4-NH2)-CH2-C(CH3)=N | " | " | -Cy(Cl)-NH-C6H3(SO3H)(SO3H) | " |
| 43 | 1-amino-2-hydroxy-naphthalene-4-sulfonic acid (HO3S, OH, NH2) | CO-N(3-NH2-C6H4)-CH2-C(CH3)=N | " | " | " | " |
| 44 | " | " | " | " | -Cy(Cl)-NH-C6H3(Cl)(SO3H) | " |
| 45 | " | " | " | " | -CO-phthalazine-1,4-dichloro | " |
| 46 | 2-amino-benzoic acid (COOH, NH2) | CO-N(3-NH2-C6H4)-CH2-C(CH3)=N | " | " | -Cy(Cl)-NH-C6H3(SO3H)(SO3H) | Yellow |
| 47 | " | CO-N(4-NH2-C6H4)-CH2-C(CH3)=N | " | " | " | " |
| 48 | 2-amino-5-sulfo-benzoic acid (COOH, NH2, SO3H) | " | " | " | -Cy(Cl)-NH-C6H3(SO3H)(SO3H) | " |

TABLE I-continued

| Ex. | Diazotization Component A | Coupling Component B | Chelating Agent EH | G | Reactive Residue Z | Shades |
|---|---|---|---|---|---|---|
| 49 | " | " | " | " | -Cy(Cl)-NH-C6H4-SO3H | " |
| 50 | " | " | " | " | -CO-[dichlorophthalazine] | " |
| 51 | 4-chloro-2-amino-phenol (OH, NH2, Cl) | 1-hydroxy-6-amino-3,6-disulfonaphthalene (OH, NH2, HO3S, SO3H) | 1,3-diphenylpropane-1,3-dione | " | -Cy(Cl)-NH-C6H4-SO3H | Blue |
| 52 | " | " | " | pyridine / H2O | " | " |
| 53 | " | " | " | " | -CO-[dichlorophthalazine] | " |
| 54 | " | " | Salicylaldehyde | " | " | " |
| 55 | " | " | " | " | -Cy(Cl)-NH-C6H4-SO3H | " |
| 56 | " | " | 2-hydroxy-1-naphthaldehyde | " | " | " |
| 57 | " | " | 4,6-dichloro-Salicylaldehyde | " | " | " |
| 58 | " | " | Salicylaldehyde | pyridine | " | " |
| 59 | " | " | 1-nitroso-2-naphtol | " | " | " |
| 60 | " | " | 1,4-dihydroxy-anthraquinone | " | " | " |

EXAMPLE 61

At ambient temperature, 74.2 parts of the 1/1 chromium complex corresponding to the following formula:

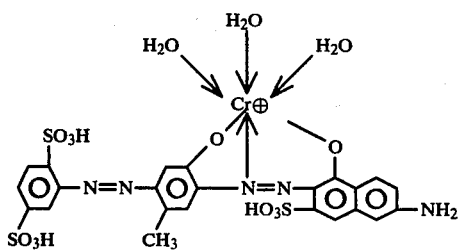

are made into a paste with 600 parts of water and 15 parts of acetylacetone. Then 40 parts of pyridine are added and the mixture is heated to 75° C. As required, the pH is kept at a value slightly about 9 by addition of a slight excess of pyridine. The temperature is kept at 75° C. for about 4 hours. The end of the condensation is detected by thin layer chromatography on silica. The dyestuff is salted out with sodium chloride, filtered, and dried at 60° C. The yield is practically quantitative.

Analysis enables the following formula to be atributed to the dyestuff:

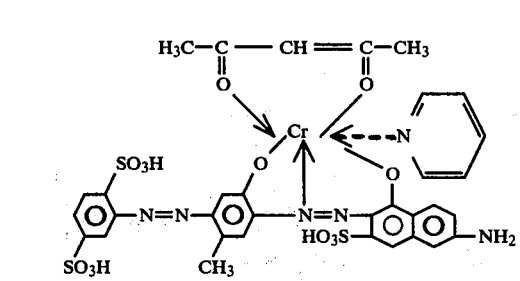

The pyridine can also be replaced by 20 parts of a dilute aqueous caustic soda solution, in which case a water molecule replaces that of pyridine in the above formula.

In 1500 parts of water are dissolved 132 parts of the chromium-bearing complex whose formula has just been given, buffering with 45 parts of crystallized sodium acetate. At ambient temperature, 48.3 parts of 1,4-dichlorophthalazine-6-carboxychloride are added in small portions over 10 minutes.

After 1 hour of stirring at ambient temperature, the mixture is heated to 40° C. and kept at this temperature until the end of condensation. The pH is raised to 7 using dilute caustic soda. The mixture is then made strongly alkaline, using 22 parts of sodium carbonate.

Finally, the complexed dyestuff is progressively salted out, using potassium chloride, filtered, and dried at 60° C. It has the following formula:

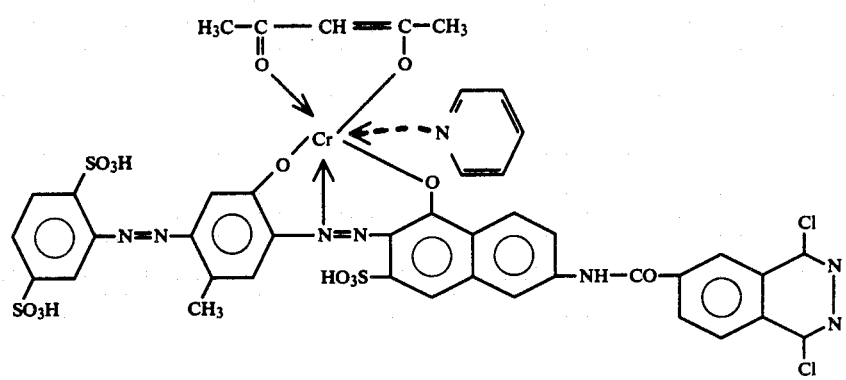

It dyes cellulose fibers to blue shades, fast to light.

Other examples of bisazo dyes of the same type as that of Example 61, and produced under experimental conditions similar to those described in Examples 1 and 61, feature in the following table (Table II).

TABLE II

| Ex. | Complex (Cr 1/1) of diazo compound as follows: | EH | G | Z | Shades |
|---|---|---|---|---|---|
| 62 | (3 H₂O) ↓ [structure with Cr⊕, SO₃H, N=N, CH₃, HO₃S, NH₂] | CH₃COCH₂COCH₃ | H₂O | [Cl-Cy-NH-phenyl-SO₃H] | Blue |
| 63 | (3 H₂O) ↓ [structure with Cr⊕, SO₃H, N=N, CH₃, SO₃H, NH₂] | " | " | " | Gray-blue |
| 64 | " | " | " | [-CO-phenyl-Cl,N,N,Cl phthalazine] | " |
| 65 | (3 H₂O) ↓ [structure with Cr+, SO₃H, N=N, NH₂, CH₃, C=N, CH₃, SO₃H] | " | " | " | Brown |
| 66 | " | " | " | [Cl-Cy-NH-phenyl-SO₃H] | " |

TABLE II-continued
| Ex. | Complex (Cr 1/1) of diazo compound as follows: | EH | G | Z | Shades |
|---|---|---|---|---|---|
| 67 | 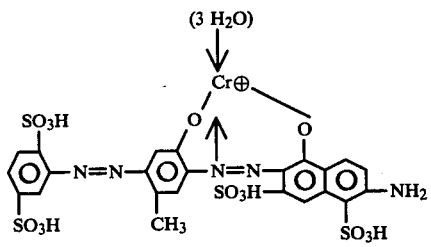 | 1,3-diphenyl-1,3-propanedione | " | 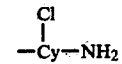 | Blue |
| 68 | " | CH₃COCH₂COCH₃ | " | 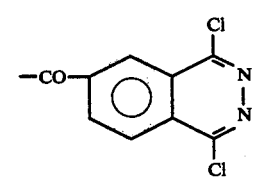 | " |
| 69 | 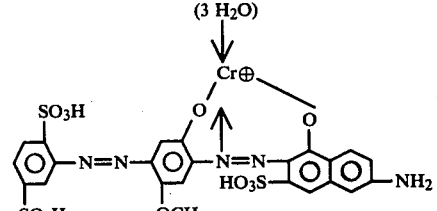 | salicylaldehyde | " | " | " |
| 70 | " | " | " | 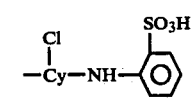 | " |
| 71 | 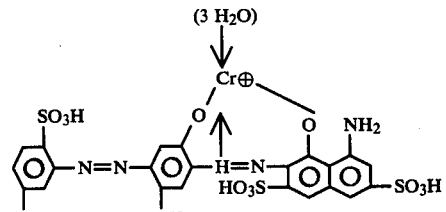 | 4,6-dichlorosal-icylaldehyde | " | 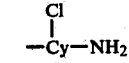 | " |
| 72 | 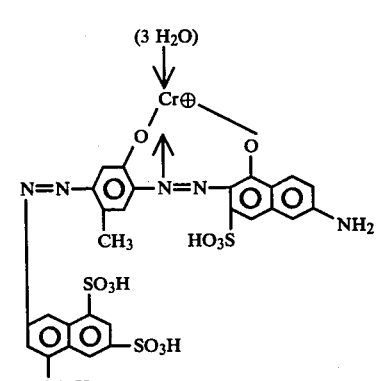 | CH₃COCH₂COCH₃ | " | 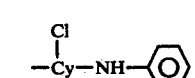 | " |
| 73 | " | salicylaldehyde | " |  | " |

TABLE II-continued

| Ex. | Complex (Cr 1/1) of diazo compound as follows: | EH | G | Z | Shades |
|---|---|---|---|---|---|
| 74 | 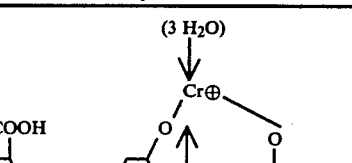 | CH₃COCH₂COCH₃ | H₂O | " | " |
| 75 | " | salicylaldehyde | " | 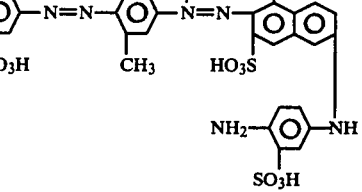 | " |

EXAMPLE 76

There are pasted and dissolved in 1000 parts of water and 25 parts of benzoylacetone, 77.1 parts of the 1/1 chromium complex corresponding to the following formula:

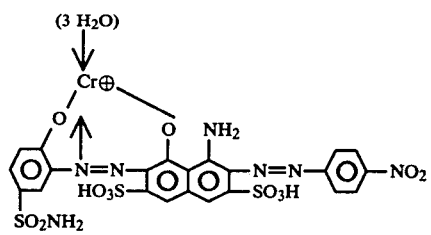

Then 25% ammonia is added to pH near 9, and the mixture is heated to 75° C. while the pH is kept at this value until the end of the reaction. The course of the reaction is followed by thin layer chromatography on silica.

When the condensation is completely finished, the solution is cooled again to 0° C. and to it are added, in small portions, 12.5 parts of sodium bicarbonate and 25 parts of cyanuryl chloride, while still keeping the pH basic. Mixing at 0° C. is continued until the end of the reaction. An aqueous basic solution of 23.5 parts of 1-aminobenzene-3-sulfonic acid is then added. The mixture is heated to 30°-35° C. during 30 minutes. A dyestuff is salted out with sodium chloride, filtered and dried at 60° C.; analysis enables the following formula to be attributed to it:

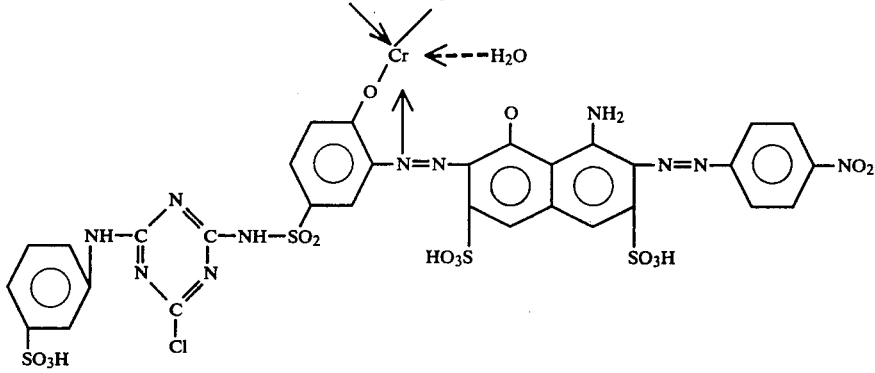

This dyestuff dyes cellulose to black shades, fast to light.

Other examples of this type of complex feature in the following table:

TABLE III

| Ex. | Complex (Cr 1/1) of diazo compound following | EH | G | Z | Shades |
|---|---|---|---|---|---|
| 77 | (3 H₂O) Cr⊕ complex: phenyl-SO₂NH₂, azo, naphthyl with OH/NH₂/HO₃S/SO₃H, azo, phenyl-NO₂ | CH₃COCH₂COCH₃ | H₂O | —Cy(Cl)—NH—C₆H₄—SO₃H | Black |
| 78 | " | " | " | —CO— phenyl fused dichloro-pyridazine | " |
| 79 | (3 H₂O) Cr⊕ complex: phenyl-SO₃H, azo, naphthyl (OH/NH₂/HO₃S/SO₃H), azo, phenyl-SO₂NH₂ | " | " | " | " |
| 80 | " | C₆H₅COCH₂COCH₃ | " | —Cy(Cl)—NH—C₆H₅ | " |
| 81 | (3 H₂O) Cr⊕ complex: phenyl(HO₃S, HO₃S), azo, naphthyl (NH₂/HO₃S/SO₃H), azo, phenyl(NO₂, SO₂NH₂) | CH₃COCH₂COCH₃ | " | " | " |
| 82 | (3 H₂O) Cr⊕ complex: phenyl, azo, naphthyl (NH₂/HO₃O/SO₃H), azo, phenyl(SO₃H, NH₂) | " | " | —Cy(Cl)—NH₂ | " |
| 83 | " | C₆H₅COCH₂COCH₃ | " | —Cy(Cl)—NH—C₆H₄—SO₃H | " |
| 84 | (3 H₂O) Cr⊕ complex: phenyl, azo, naphthyl (NH₂/HO₃S/SO₃H), azo, phenyl-SO₂NH₂ | C₆H₅COCH₂COCH₃ | " | " | " |

TABLE III-continued

| Ex. | Complex (Cr 1/1) of diazo compound following | EH | G | Z | Shades |
|---|---|---|---|---|---|
| 85 | 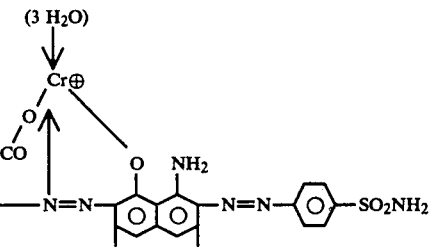 | CH₃COCH₂COCH₃ | " | 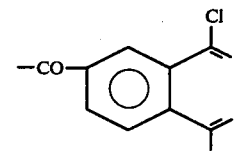 | " |
| 86 | 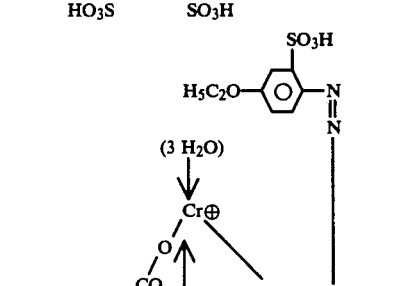 | " | " | " | " |

EXAMPLE 87

Under conditions similar to those already described in the preceding examples, a compound having the following formula is prepared:

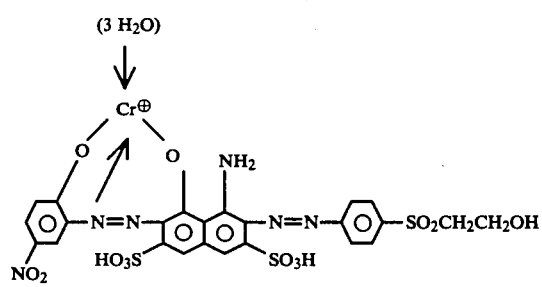

The beta-hydroxyethyl-sulfonyl group which this compound possesses may be changed into a beta-sulfatoethylsulfonyl group by treatment of the dyestuff with a sulfating agent such as concentrated sulfuric acid, chlorosulfonic acid, or a mixture of these, at a temperature ranging preferably between 0° C. and 25° C.

Thus, 80 parts of the 1/1 chromium complex corresponding to the above formula are made into a paste and dissolved in 1000 parts of water and 15 parts of acetylacetone. Ammonia is added until the pH is near 9, and the mixture is heated to 75° C. until the end of the reaction as observed by thin layer chromatography on silica. After cooling, the dyestuff is salted out with sodium chloride, filtered and dried under reduced pressure; it has the formula:

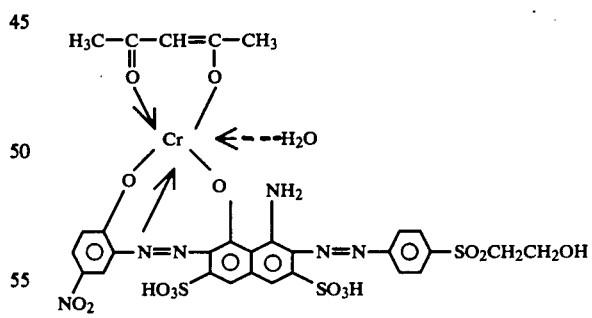

To 150 parts of pure sulfuric acid, cooled to 5° C.–10° C. there is slowly added, in small portions, 50 parts of the dry powder corresponding to the formula given above. After 3 hours of mixing, the mixture is poured onto 300 parts of ice, and the dyestuff is salted out with 100 parts of potassium chloride, and is filtered. The cake of dyestuff is then taken up in water again, and the solution is partly neutralized (pH ~ 6) with sodium carbonate. Evaporation under reduced pressure gives a black powder which corresponds to the following formula:

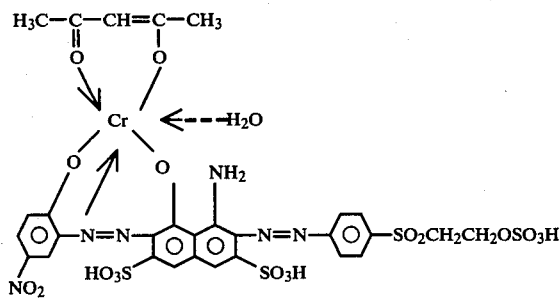

The dyestuff thus obtained can be utilized for printing or dyeing a cotton or wool fabric to a black shade, fast to washing and to light.

Other examples of a similar nature are given by way of non-limitative indication, in Table IV.

TABLE IV

| Ex. | Complex (Cr 1/1) of diazo compound following | EH | G | Reactive Groups | Shades |
|-----|-----------------------------------------------|-----|-----|-----------------|--------|
| 88  | (3 H$_2$O) ↓ [Cr complex with NO$_2$-phenyl-N=N-naphthalene(NH$_2$, HO$_3$S, SO$_3$H)-N=N-] | CH$_3$COCH$_2$COCH$_3$ | H$_2$O | —⟨○⟩—Cl, SO$_2$NHCH$_2$CH$_2$, OSO$_3$H | Black |
| 89  | ″ | C$_6$H$_5$COCH$_2$COCH$_3$ | ″ | ″ | ″ |
| 90  | (3 H$_2$O) ↓ [Cr complex with SO$_3$H-phenyl-N=N-naphthalene(NH$_2$, HO$_3$S, SO$_3$H)-N=N-] | CH$_3$COCH$_2$COCH$_3$ | ″ | —⟨○⟩—SO$_2$CH$_2$CH$_2$, OSO$_3$H | ″ |
| 91  | ″ | ″ | ″ | —⟨○⟩—SO$_2$NHCH$_2$, CH$_2$Cl | ″ |
| 92  | (3 H$_2$O) ↓ [Cr complex with (HO$_3$S)$_2$-phenyl-N=N-naphthalene(NH$_2$, HO$_3$S, SO$_3$H)-N=N-] | ″ | ″ | ″ | ″ |
| 93  | (3 H$_2$O) ↓ [Cr complex with HO$_3$S, COO-phenyl-N=N-naphthalene(NH$_2$, HO$_3$S, SO$_3$H)-N=N-] | ″ | ″ | —⟨○⟩—SO$_2$CH$_2$, CH$_2$OSO$_3$H | ″ |

TABLE IV-continued

| Ex. | Complex (Cr 1/1) of diazo compound following | EH | G | Reactive Groups | Shades |
|---|---|---|---|---|---|
| 94 | " | " | " | 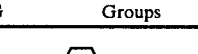 —⟨O⟩—SO₂NHCH₂—CH₂Cl | " |
| 95 | " | " | " | 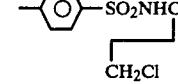 ⟨O⟩—Cl, SO₂NHCH₂—CH₂OSO₃H | " |

EXAMPLE 96

In this example, the starting material is the compound whose preparation was described in Example 1 and which corresponds to the following formula:

molecule. Thus, to 80 parts of the above dyestuff, dissolved in a minimum of water at a temperature between 0° C. and 10° C., there is added a slightly basic aqueous solution containing 62 parts of the 1/1 chromium-bearing acetylacetone complex of the monoazo substance obtained by diazotization and coupling of 4-nitro-2-amino-phenol with 1-amino-8-hydroxynaphthalene-3,6-disulfonic acid. While heating gently up to 35° C., the pH is kept at a value equal to or exceeding 8. At completion of the reaction, a dyestuff is salted out and filtered, and corresponds to the following formula:

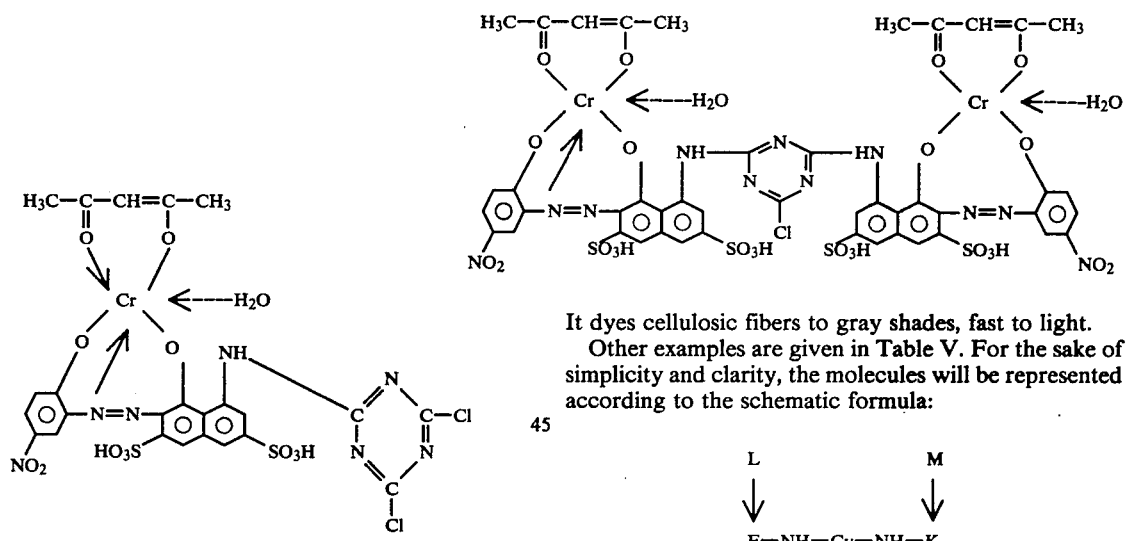

It dyes cellulosic fibers to gray shades, fast to light.

Other examples are given in Table V. For the sake of simplicity and clarity, the molecules will be represented according to the schematic formula:

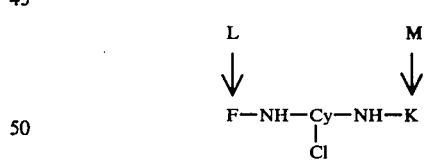

and there is caused to react with the second active chlorine of the cyanuryl chloride another molecule of 1/1 chromium complex, identical or different and condensed or not with a chelating agent or any monoazo The significance of the symbols L, F, K, M may be derived from reading Table V, which follows:

TABLE V

| Ex. | F—NH— | L | —NH—K | M | Shade |
|---|---|---|---|---|---|
| 97 | [Cr complex: naphthalene with NH—, SO₃H, O—Cr—O, N=N, phenyl with NO₂] | CH₃COCH₂COCH₃ | [Cr complex: naphthalene with HO₃S, HN—, O—Cr—O, N=N, SO₃H, phenyl with NO₂] | C₆H₅COCH₂COCH₃ | Gray |
| 98 | " | " | " | 4,6-dichlorosalicylaldehyde | " |
| 99 | [Cr complex: naphthalene with NH—, SO₃H, O—Cr—O, N=N, HO₃S, phenyl with Cl] | " | [Cr complex: naphthalene with HO₃S, HN—, O—Cr—O, N=N, SO₃H, phenyl with Cl] | " | Blue |
| 100 | [Cr complex: naphthalene with NH—, SO₃H, O—Cr—O, N=N, HO₃S, dichlorophenyl] | C₆H₅COCH₂COCH₃ | | | " |
| 101 | [Cr complex: naphthalene with NH—, SO₃H, O—Cr—O, N=N, HO₃S, phenyl with NO₂] | CH₃COCH₂COCH₃ | [Cr complex: naphthalene with SO₃H, O—Cr—O, N=N, C—CH₃, N=C, —NH—phenyl] | CH₃COCH₂COCH₃ | Violet |

TABLE V-continued

| Ex. | F—NH— | L | —NH—K | M | Shade |
|---|---|---|---|---|---|
| 102 | | | | | Green |
| 103 | | " | " | " | |
| 104 | | " | " | " | Red |
| 105 | | " | " | C₆H₅COCH₂COCH₃ | " |
| 106 | | " | " | CH₃COCH₂COCH₃ | " |

TABLE V-continued

| Ex. | F—NH— | L | —NH—K | M | Shade |
|---|---|---|---|---|---|
| 107 | (chromium complex structure with COO, Cr, SO₃H, CH₃, N=N, NH-) | " | " | " | " |
| 108 | " | " | (structure with OH, SO₃H, COOH, Cl, SO₂NH—, N=N) | " | Orange |
| 109 | " | " | (naphthalene structure with two SO₃H, CH₃, SO₂NH—, N=N) | " | " |
| 110 | (chromium complex structure with naphthalene, SO₃H, O, Cr, O, N=N, CH₃, NH—) | " | " | " | " |

EXAMPLE 111

In 1500 parts of water at 50° C. are dissolved 1 part of the dyestuff of Example 87 (in the form of its sodium salt) represented by the preceding formula and, after 15 parts of acetic acid have been added to this solution, 50 parts of wool are immersed in it. The temperature is raised to 95° C. in 30 minutes and maintained at this point for 1 hour. The dyebath is then neutralized with ammonia, and dyeing proceeds for 30 minutes. After washing, a black dyeing is obtained, with good fastness to light.

EXAMPLE 112

One part of the dyestuff described in Example 27 is dissolved in 5000 parts of water with the addition of a commercial wetting agent based on sodium alkylnaphthalenesulfonate, and a quarter of the quantity of electrolyte necessary (anhydrous sodium sulfate). The total quantity of electrolyte is around 200 g/l. Into this dyebath at 50° C. are placed 100 parts of cotton fibers, which are kept in constant movement. The temperature is brought to 85° C. in 30 minutes. In two batches, the remaining three-quarters of the electrolyte are then added, while maintaining the temperature at 85° C. for ½ hour. Dyeing is then carried out during 30 minutes at 85° C. in the presence of 75 parts of anhydrous sodium carbonate. After this, the goods are carefully rinsed, and are dried at 80° C. A blue dyeing is obtained, having good fastness to light. The Lénetol NS (Trademark) is a mixture of ionic and non-ionic surfactants.

EXAMPLE 113

A padding bath is prepared with 30 parts of dyestuff (described in Example 27), 5 parts of a wetting agent, 100 parts of urea, 10 parts of sodium chloride, 15 parts of caustic soda (35° Bé) and 1000 parts of water. A cotton fabric is padded in this bath at ambient temperature, wrung out to a retention very close to 100%. The fabric is then wound up cold, and the shade is allowed to develop, protected from the air, at a temperature ranging between 20° and 30° C., for 8 to 24 hours according to the shade. After this, the goods are rinsed in cold water, then in hot, and are then washed at the boil, as mentioned in the preceding dyeing process. Finally, further rinsing and drying at 80° C. A blue shade is obtained, very fast to light.

EXAMPLE 114

A padding bath is prepared as in the preceding Example, with the dyestuff of Example 43 (the alkaline agent here being anhydrous sodium carbonate). The cotton cloth thus padded is given an intermediate drying, to provent any migration of the dyestuff, and is then heat-set for 5 minutes at 140°-150° C. Finally, after rinsing, the goods are washed, again rinsed, and dried at 80° C. A red shade is obtained, very fast to light.

EXAMPLE 115

A padding bath is prepared as described in Example 110 with the dyesutff of Example 91. The cotton fabric is padded, mangled, given an intermediate drying to prevent any migration, and then steamed for 1 to 2 minutes at 102°-105° C. (according to the dye and the depth of shade).

Finally, washing, rinsing, and drying, giving the cotton fabric a black shade, very fast to light.

EXAMPLE 116 (COMPARATIVE)

A₁—Cotton fibers (100 g.) are dyed with 2 g. of the dyestuff of Example 4, utilizing the dyeing process described in Example 112. A gray shade is obtained, brilliant and fast to light.

A₂—Trial A₁ is repeated with 1 g. of dyestuff instead of 2 g.

B—In Example 116-A₁ above, the dyestuff according to the invention is replaced by the reactive 1/1 dyestuff of the prior art, or formula:

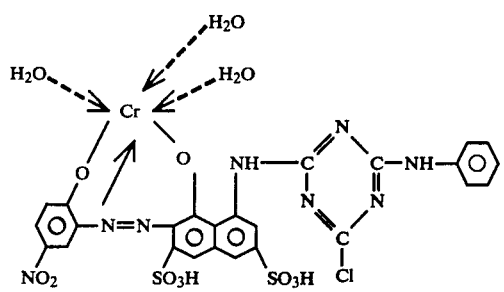

The shade is close to that obtained in $A_1$ or $A_2$, but the coloring strength is inferior to that of $A_2$; that is, less than half that obtained according to the invention.

C—Example 116-A₁ is repeated, replacing the dyestuff according to the invention by the already-known reactive ½ dyestuff of the formula:

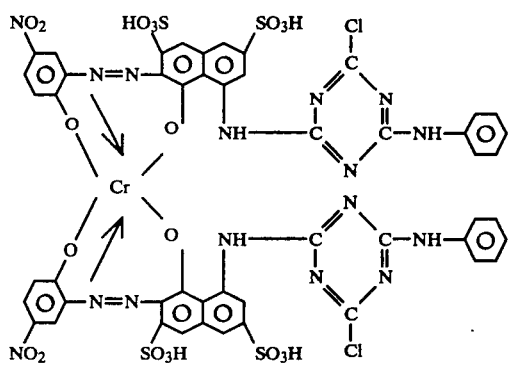

The shade is close to that obtained in $A_1$, $A_2$ or B, but the coloring strength is lower than a quarter of that obtained according to the invention.

Further modifications of the present invention will be apparent to those skilled in the art upon a study of this invention.

We claim:

1. A complex chromium bearing dyestuff of the formula:

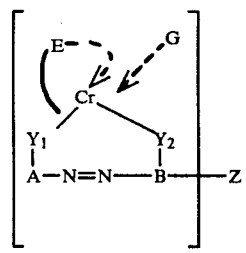

wherein A represents a phenylene or naphthylene nucleus; B represents a coupling component selected from the group consisting of acetoacetarylide, aniline, phenol, 5-pyrazolone, naphthylamine and naphthol, A and B being unsubstituted or substituted by one or more of sulfo, halogen, nitro, alkyl having 1–4 carbon atoms, alkoxy having 1–4 carbon atoms, acetylamino, unsubstituted phenylamino, phenylamino substituted by sulfo, unsubstituted phenylazo or naphthylazo, phenylazo or naphthylazo substituted by one or more of nitro, halogen, carboxy, sulfo or alkoxy having 1–4 carbon atoms, unsubstituted phenyl or phenyl substituted by one or more of sulfo or halogen, at least one —SO$_3$H group being present per atom of chromium;

$Y_1$ represents the residue —O— or

$Y_2$ represents the residue —O— or —NH—;
$Y_1$ and $Y_2$ are respectively in the ortho position with respect to the —N=N— group;
E represents the residue of a monoanionic bifunctional chelating agent;
G represents a neutral monofunctional ligand; and
Z represents a reactive group attached to A or to B directly or via a bridging group

—SO$_2$NH— or —CONH— wherein R is hydrogen or alkyl having 1 to 2 carbon atoms.

2. A complex chromium bearing dyestuff as set forth in claim 1 wherein the monoanionic bifunctional chelating agent E-H corresponding to the residue E is a beta-diketone, an acetoacetarylide, an o-hydroxyaldehyde, an o-nitrosophenol or naphthol or a peri-hydroxyquinone.

3. A complex chromium bearing dyestuff as set forth in claim 1 in which the neutral ligand G represents water, ammonia or an organic base.

4. A complex chromium bearing dyestuff as set forth in claim 3 in which the organic base is pyridine, laurylamine, ethylamine or ethanolamine 5. A complex chromium bearing dyestuff as set forth in claim 1 wherein Z is —SO$_2$—CH$_2$—CH$_2$—OSO$_3$H, —SO$_2$—NH—CH$_2$—CH$_2$OSO$_3$H, —SO$_2$—CH=CH$_2$, —SO$_2$—CH$_2$—CH$_2$Cl, —SO$_2$—NH—CH$_2$—CH$_2$Cl or is of the formula:

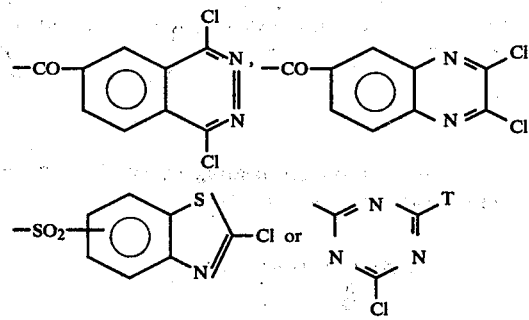

wherein T is chlorine, amino, unsubstituted phenylamino, phenylamino substituted by one or more of sulfo, alkyl having 1–4 carbon atoms or halogen, or a residue of the formula:

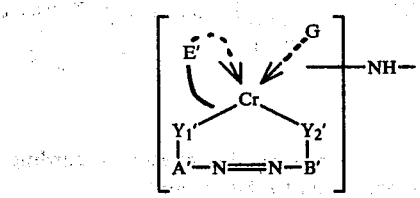

in which A', B', E', G', Y'$_1$ and Y'$_2$ have the significance defined above for A, B, E, G, Y$_1$ and Y$_2$ and NH is attached to A or to B.

6. A complex chromium bearing dyestuff according to claim 5 corresponding to the formula:

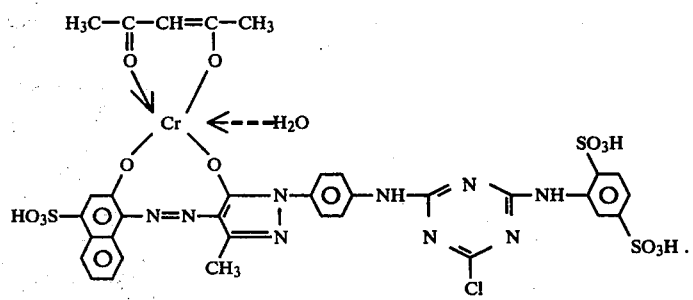

7. A complex chromium bearing dyestuff according to claim 5 corresponding to the formula:

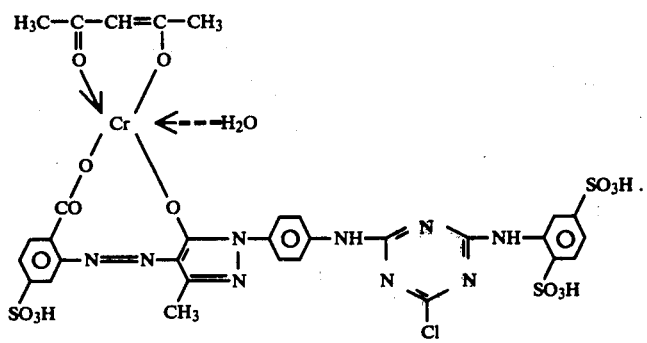
8. A complex chromium bearing dyestuff according to claim 5 corresponding to the formula:
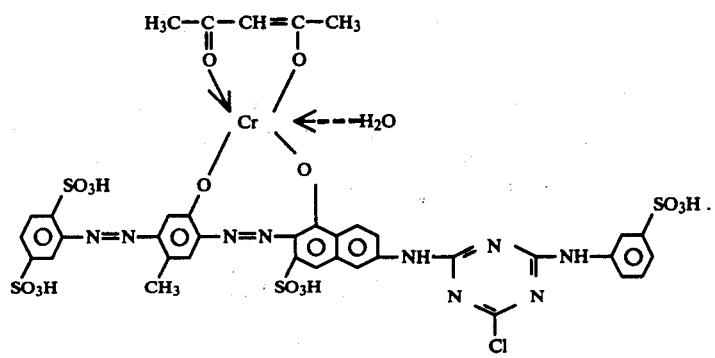
9. A complex, chromium-bearing dyestuff according to claim 22 corresponding to the formula:
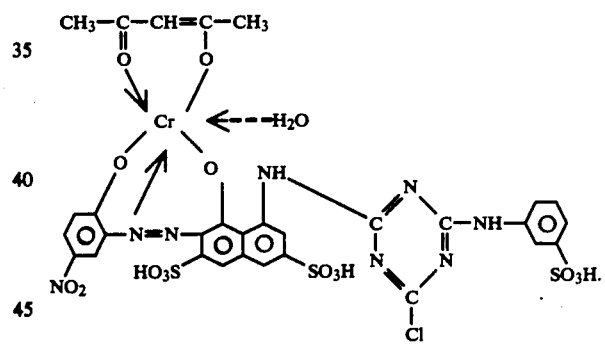
10. A complex, chromium-bearing dyestuff according to claim 5 corresponding to the formula:
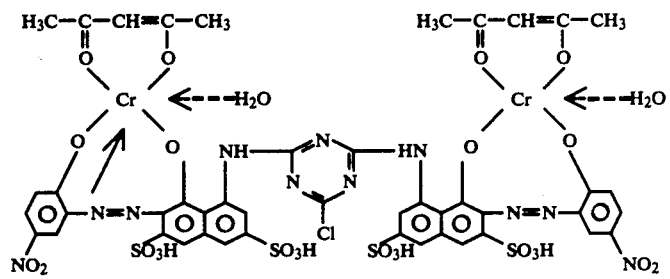
* * * * *